(12) United States Patent
Lafragette et al.

(10) Patent No.: US 6,851,985 B2
(45) Date of Patent: Feb. 8, 2005

(54) CONNECTION DEVICE FOR AN ELECTRONIC BOX

(75) Inventors: Pascal Lafragette, Macon (FR); Johann Cisey, Saint Symphorien d'Ancelles (FR); Luc Doutaz, Bron (FR)

(73) Assignees: ABB Entrelec, Villeurbanne (FR); Siemens AG, Nuremberg (DE)

( * ) Notice: Subject to any disclaimer, the term of this patent is extended or adjusted under 35 U.S.C. 154(b) by 0 days.

(21) Appl. No.: 10/406,240

(22) Filed: Apr. 4, 2003

(65) Prior Publication Data

US 2004/0082214 A1 Apr. 29, 2004

(30) Foreign Application Priority Data

Apr. 23, 2002 (FR) .............................................. 02 05075

(51) Int. Cl.⁷ ............................................. H01R 13/502
(52) U.S. Cl. ...................................... 439/701; 439/717
(58) Field of Search ................................. 439/701, 717

(56) References Cited

U.S. PATENT DOCUMENTS 4,171,862 A * 10/1979 Krasser ...................... 439/717
5,915,978 A * 6/1999 Hayakawa et al. ......... 439/76.2
6,196,882 B1 * 3/2001 Sato et al. ................... 439/701
6,375,517 B1 * 4/2002 Okabe et al. ................ 439/701
6,488,546 B2 * 12/2002 Sakurai et al. .............. 439/701

FOREIGN PATENT DOCUMENTS

EP          1 124 286 A1      8/2001

* cited by examiner

Primary Examiner—Gary Paumen
(74) Attorney, Agent, or Firm—Oliff & Berridge, PLC

(57) ABSTRACT

This device comprises a connection module (3) intended to be coupled with the longitudinal mating face of a box (2) and making an electrical connection with, on the one hand, pins protruding from this longitudinal mating face and, on the other hand, with conducting cables, the module (3) and the box (2) being mated by a system of slides (7, 8) allowing them to be fastened by longitudinal sliding, with locking by a resilient tab (10).

The resilient tab (10) is associated with the box (2) and is intended to cooperate with a locking member (16) associated with the connection module (3).

10 Claims, 7 Drawing Sheets

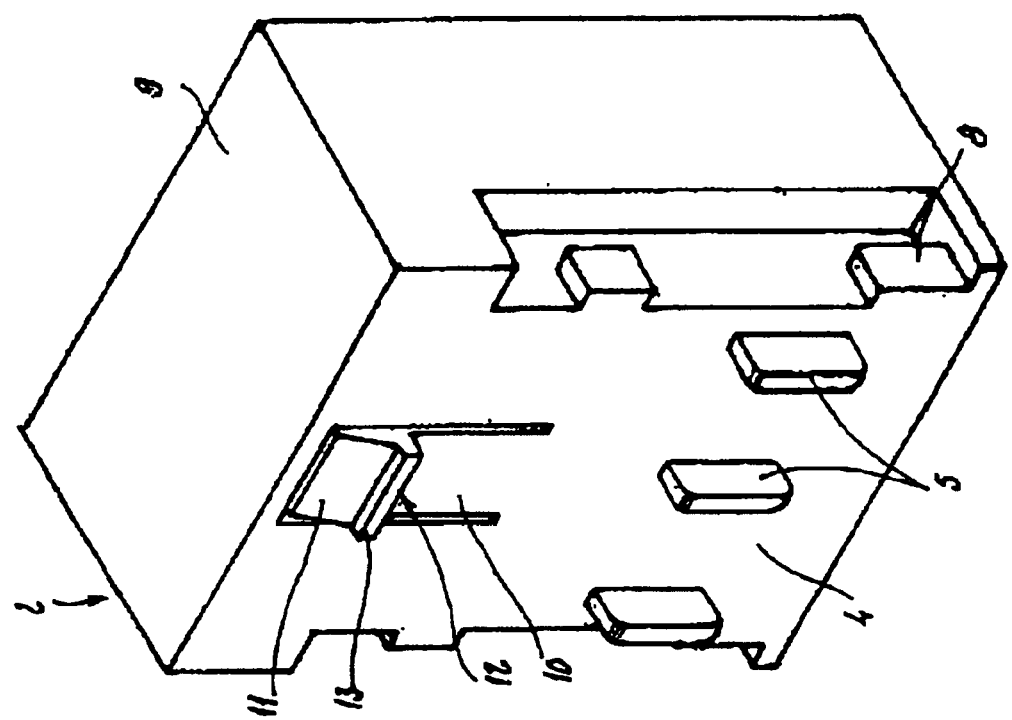
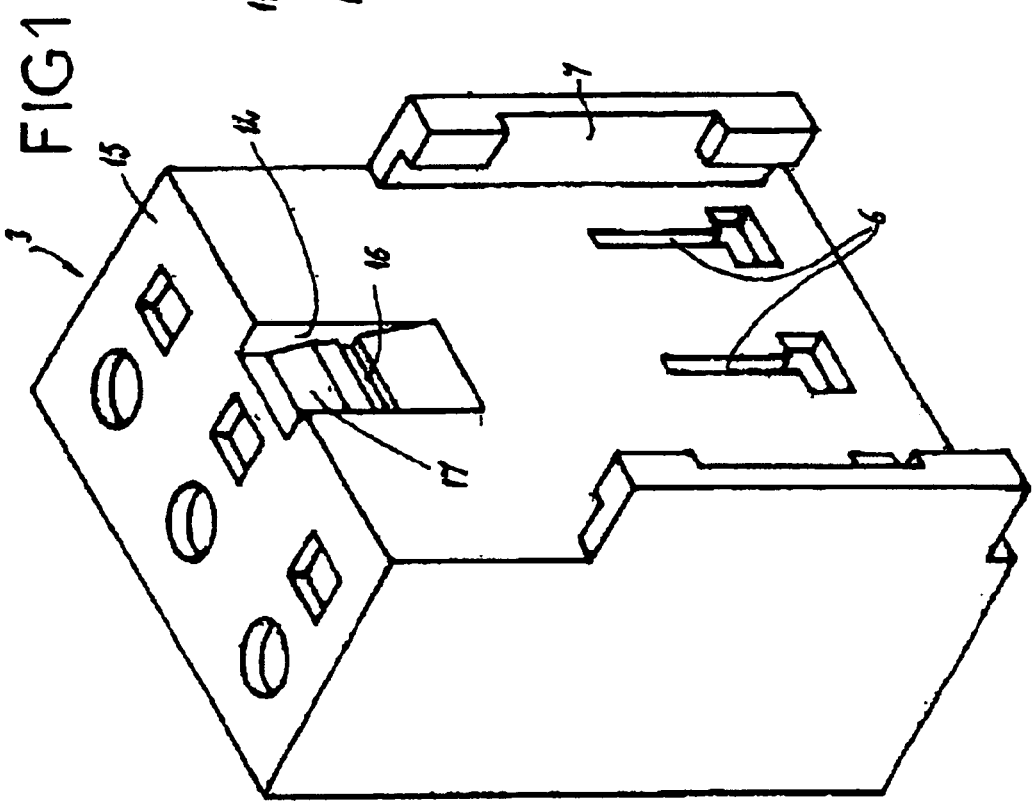
FIG 1

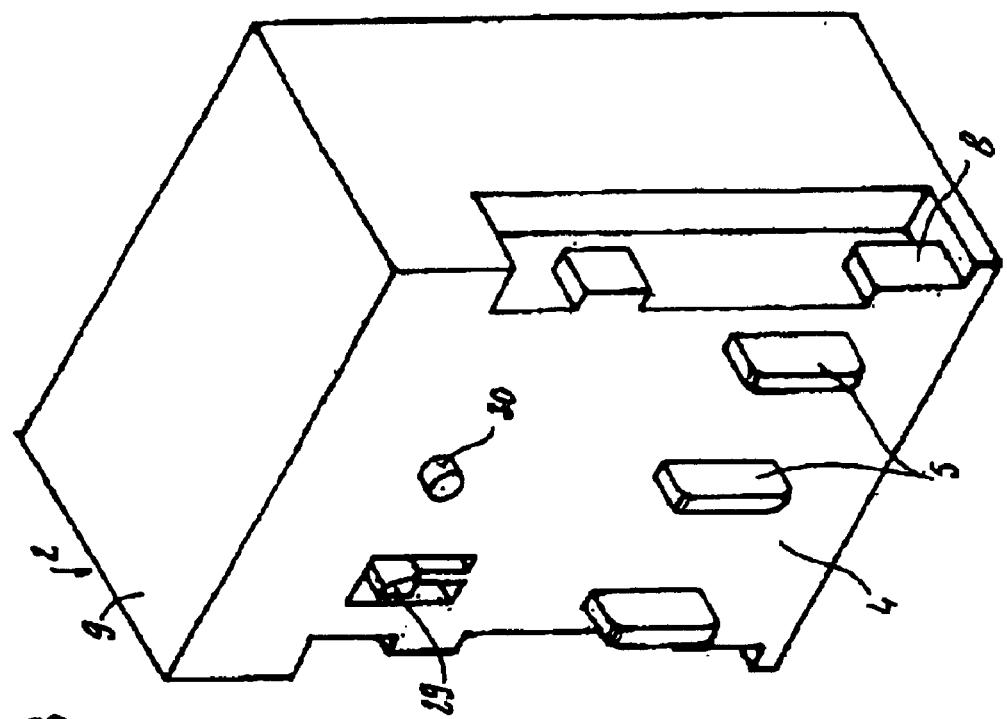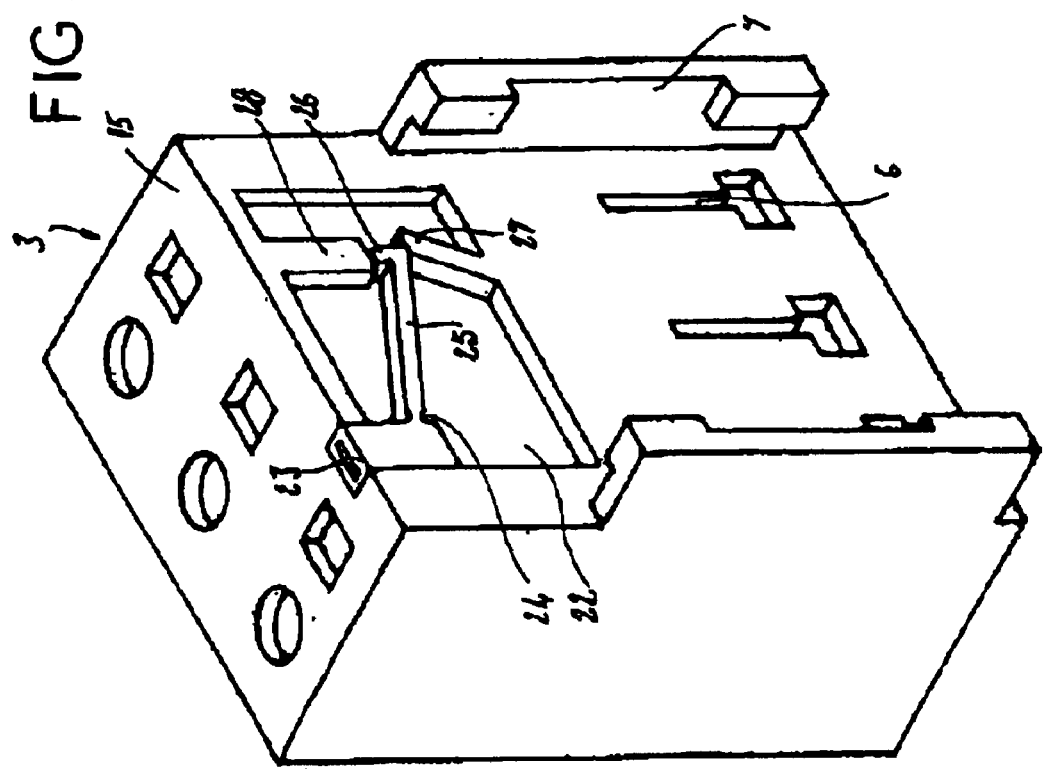

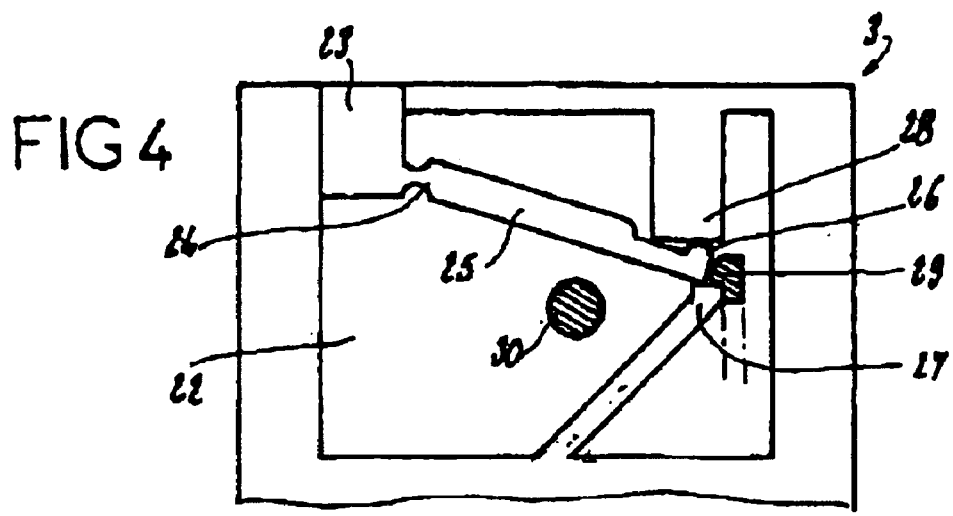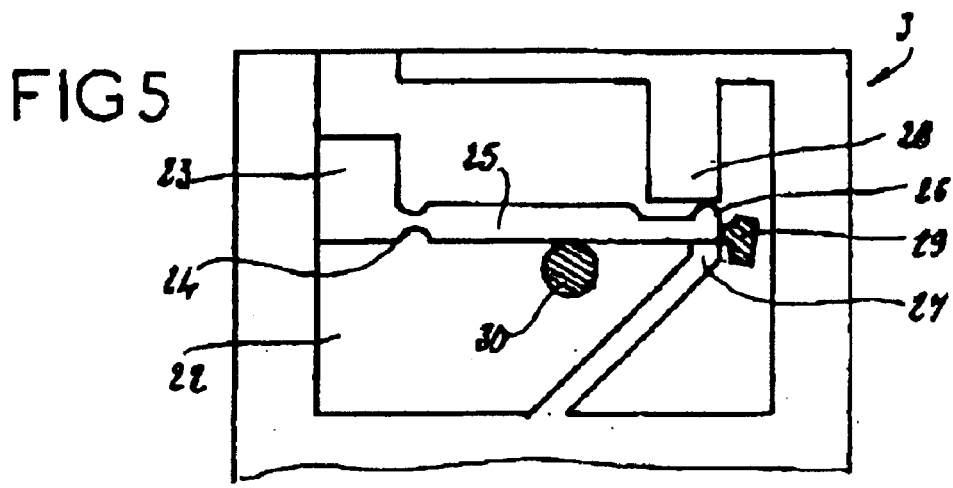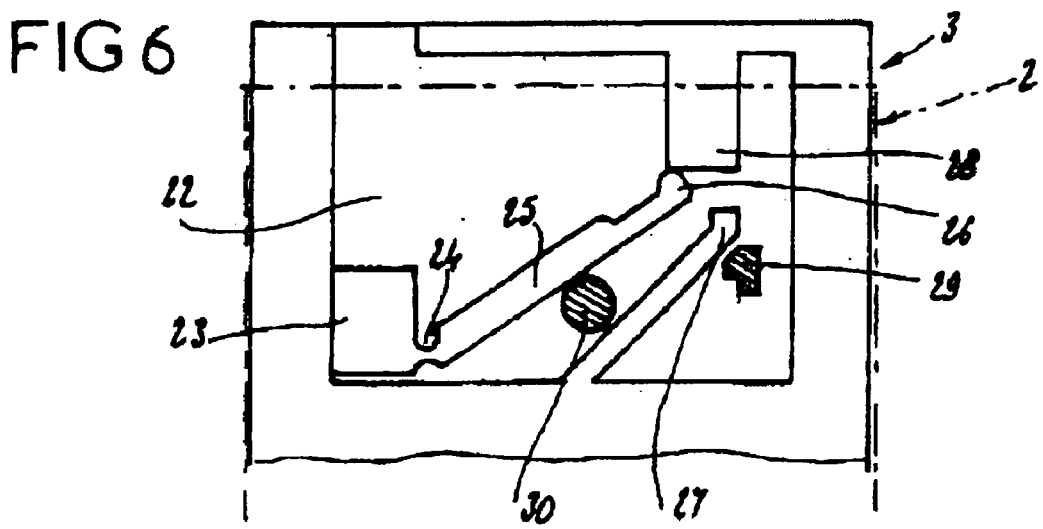

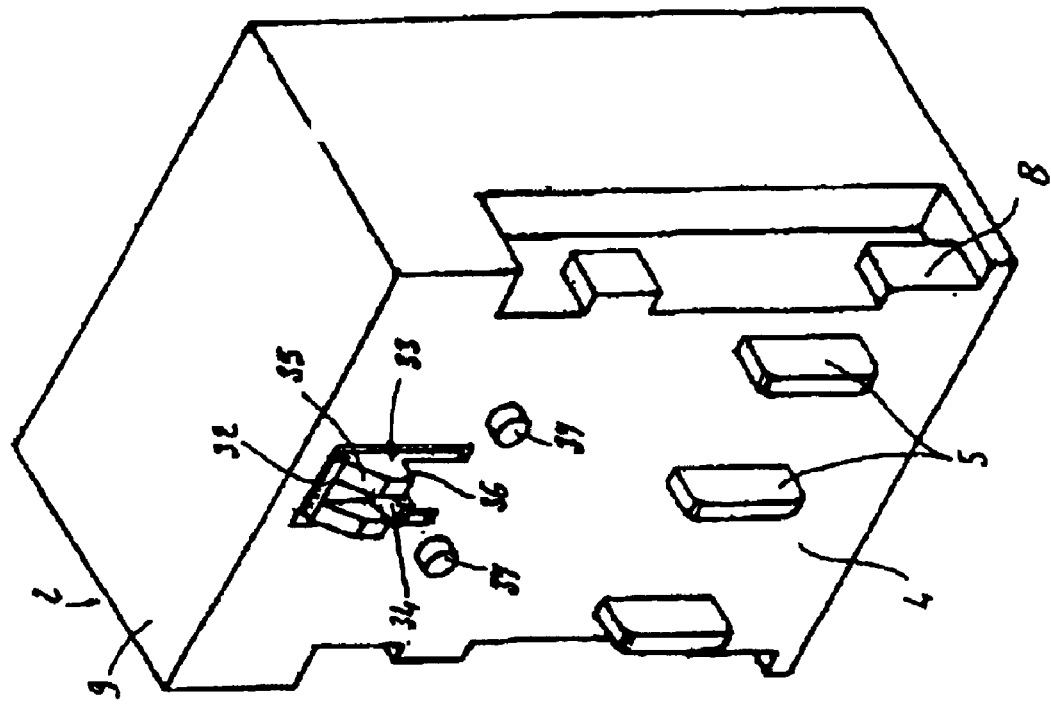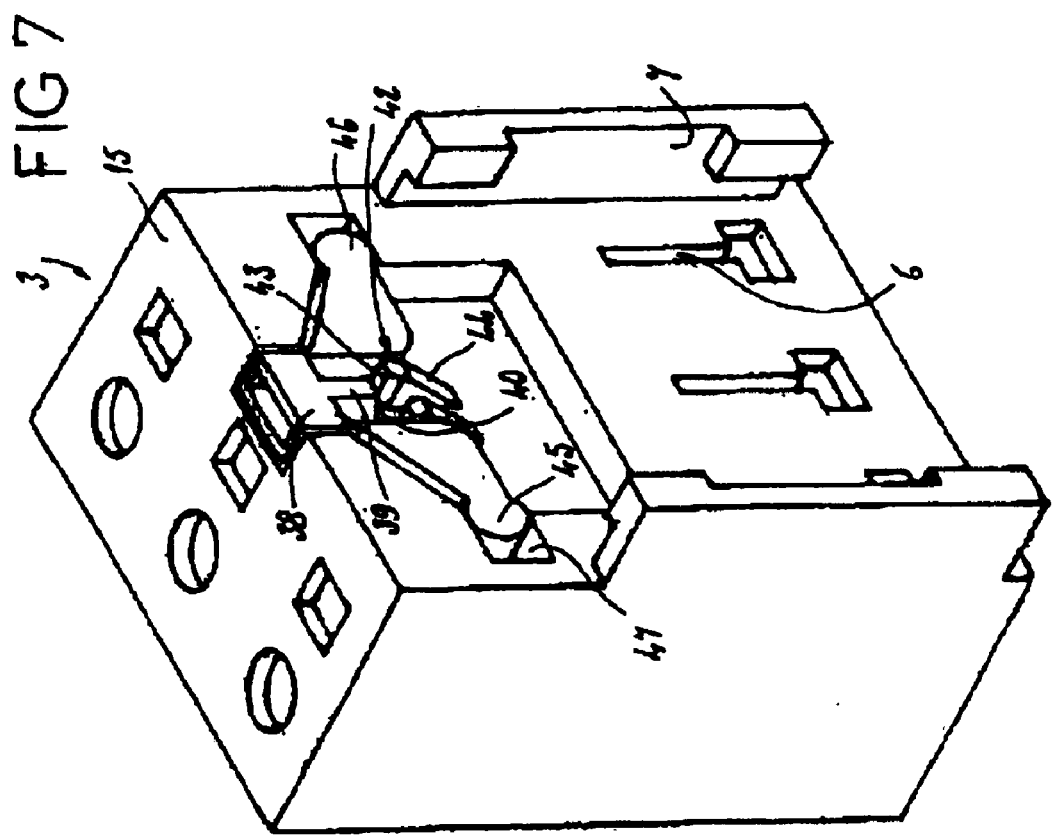
FIG 7

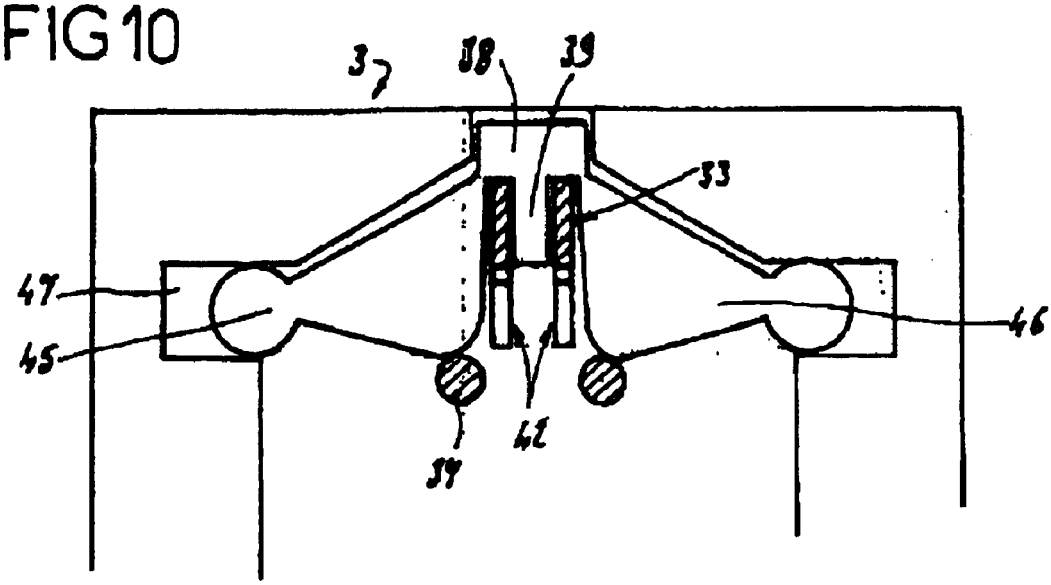
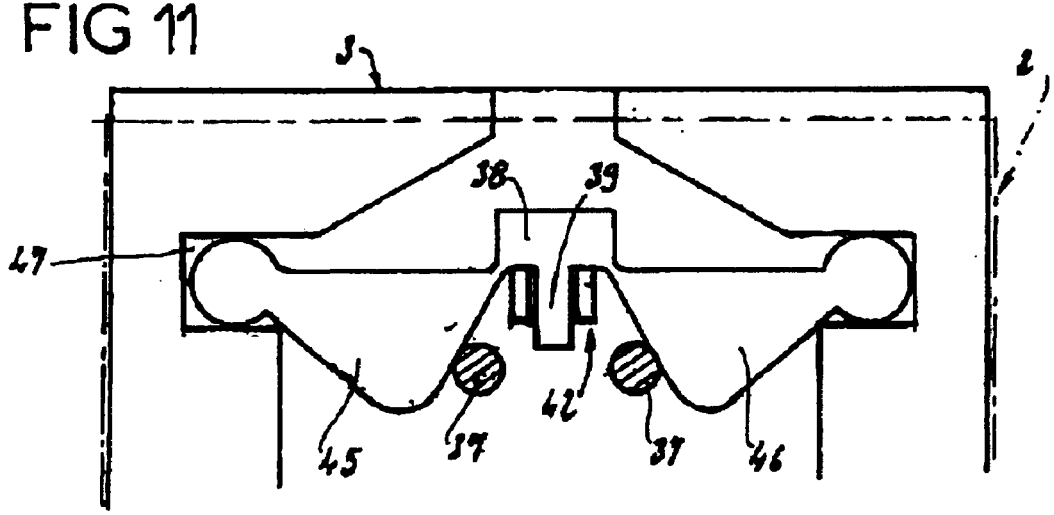

CONNECTION DEVICE FOR AN ELECTRONIC BOX

BACKGROUND OF THE INVENTION

The subject of the present invention is a connection device for an electronic box.

DESCRIPTION OF THE PRIOR ART

Electronic boxes used in the industrial field are generally mounted in cabinets and are juxtaposed on one and the same rack, it being possible for several racks to be superimposed. These boxes possess a parallelepipedal general shape and each has one or more connection pins for connecting them to conducting cables that are connected to various types of equipment, such as timepiece systems, relays or signal processing equipment.

Since in general a box is accessible only via a longitudinal face, connection to the conducting cables is accomplished by means of connection modules each fixed to the longitudinal mating face of a box. A connection module contains connection pieces with flat pins extending beyond the box, and a device for fastening the conducting cables, this being intended to be linked with these pins. It is known to fasten a connection module to the longitudinal face of a box by a slide system, allowing longitudinal sliding, with locking by a resilient tab.

In general, the resilient tab is provided in the connection module, by cutting the wall of this module, and it fits into a recess made in the mating face of the box.

To disconnect a module from the corresponding box, it is necessary to actuate the locking tab by means of a tool, such as a screwdriver, in order to disengage it from the recess in which it is fitted. In practice, there are several difficulties. Firstly, the operator does not know exactly where to engage the tool, since the configuration of the locking tab provides several slots in the upper face of the assembly formed by a box and a module. If the screwdriver is engaged on the wrong side, there is a risk of destroying the locking tab. Furthermore, it is necessary, after the tool such as a screwdriver has been introduced, to actuate the latter laterally in order to make the tab pivot. This operation is not simple to carry out and is accompanied by axial pressure on the module in a direction opposite to the direction in which the module slides toward the point for disconnecting it from the box.

SUMMARY OF THE INVENTION

The object of the invention is to provide a connection device for an electronic box, which allows a connection module associated with this box to be easily disconnected and without any risk of destroying it.

For this purpose, the device to which the invention relates comprises a connection module intended to be coupled with the longitudinal mating face of a box and making an electrical connection with, on the one hand, pins projecting from this longitudinal mating face and, on the other hand, with conducting cables, the module and the box being mated by a system of slides allowing them to be fastened by longitudinal sliding, with locking by a resilient tab, wherein the resilient tab is associated with the box and is intended to cooperate with a locking member associated with the connection module.

Since the resilient locking tab is associated with the box, when an action is exerted in the unlocking direction, this action is exerted on the box and not on the connection module, allowing the latter to be easily removed.

According to a first embodiment of this device, the resilient locking tab is in the form of an elastically deformable hook provided with a catching rib, while the locking member associated with the connection module has a groove with which the rib of the hook is intended to be engaged, in the locking position.

Advantageously, the connection module includes, in its mating face for mating with the box, a recess which, intended for housing the locking hook on the box, is bounded on the inside of the module by a surface which is inclined from the upper face of the module toward its lower face, and from the inside outward, the groove for accommodating the rib of the hook being situated below this inclined surface and the hook has, above its catching rib, a surface that is inclined from the upper face of the box toward its lower face, and from the inside outward.

This arrangement is advantageous insofar as the two inclined surfaces, of the module and the box respectively, define, in the mating position, a V-shaped recess. When a tool, such as a screwdriver, is introduced into this V-shaped recess, the tab tilts, ensuring that the rib comes out of the rib in which it is engaged, under the action of a simple translational movement of the screwdriver, without requiring a tilting movement of the latter. Furthermore, the hook is disengaged before the screwdriver comes level with the rib, thus avoiding any risk of damaging the latter.

According to a second embodiment of this device, the box includes an elastically deformable hook intended, in the locking position, to engage behind a stop integral with the connection module, the latter being equipped with an unlocking piece having a drive part which, accessible from its upper face, is able to be moved in translation, perpendicular to the latter, a part for actuating the hook toward its unlocking position, when the drive part has undergone a first travel, a part for bearing on a fixed stop on the box when the drive part has undergone a second travel and a part for bearing on a fixed stop on the module, for the purpose of making the module slide relative to the box, when the drive part is actuated beyond this second travel.

Advantageously, the piece for unlocking the connection module comprises a drive part formed by a stud to which one end of a rigid arm is articulated, about an axis perpendicular to the axis of translation of the stud, the other end of which rigid arm is engaged between two vertically offset stops, the lower one of which serves for catching the hook on the box, the length of the arm being such that, when the drive stud is opposite the stops, the free end of the arm disengages the hook with respect to the bottom stop for catching the latter, a fixed stop being provided on the box, beneath the stops on the module and approximately halfway along the arm, against which stop the arm bears when the stud is actuated in translation beyond the position of disengagement of the hook, the free end of the arm then bearing against the high stop on the module and ensuring that the latter moves in translation with respect to the box.

This device is advantageous as not only is the unlocking obtained by a simple translation movement exerted on the unlocking piece, but also the end of this translation movement allows disengagement of the module relative to the box.

According to another embodiment of this device, the box includes, in its mating face, an elastically deformable tab located approximately at mid-width of this face and having two locking hooks located on either side of a central unlocking rib, while the connection module includes two fixed stops intended to cooperate with the two hooks on the box and is equipped with an unlocking piece mounted so as to slide perpendicular to the upper face of the module and having a rib intended, when the piece is pushed into the module, to bear against the central rib of the tab on the box in order to make said tab tilt toward the position for unlocking the hooks.

According to one feature of the device, the hooks on the box and the catching stops on the module have catching surfaces perpendicular to the mating plane of the box and of the module and engagement surfaces of reverse inclination in the case of the box and the module. The engagement surfaces of the stops bearing on the catching surfaces of the hooks makes it possible, when fitting the module onto the box, to make the tab tilt in the direction for retracting the hooks. When the engagement surfaces separate from each other, the perpendicular catching surfaces ensure retention of the module in the box.

Advantageously, the central unlocking rib goes beyond the tab locking hooks on the box.

The fact that this central unlocking rib is thicker than the locking hooks allows the tab to pivot sufficiently for the locking hooks to escape the catching stops on the module.

According to another advantageous feature of this device, the piece for unlocking the connection module is extended by two symmetrical branches that are articulated to the piece about axes perpendicular to the mating plane of the box and of the module, the free ends of the branches being engaged in two horizontal cavities provided in the module, and the branches being each intended to bear, when the unlocking piece is actuated beyond the position for releasing the hooks, against a fixed stop integral with the box, so as to cause the ends of the branches to tilt upward and the module to move relative to the box. In this case too, the simple translation of the unlocking piece not only allows the module to be unlocked from the box but also to move the module relative to the box.

BRIEF DESCRIPTION OF THE DRAWINGS

In any case the invention will be fully understood from the description that follows, with reference to the appended schematic drawings showing, by way of nonlimiting examples, several embodiments of this device.

FIG. 1 is an exploded perspective view of a first device.

FIG. 3 is an exploded perspective view of a second device.

FIGS. 4 to 6 are three simplified schematic views corresponding to three positions—the locked position, the position during unlocking and the unlocked position of the module with respect to the box.

FIG. 7 is an exploded perspective view of a third embodiment of this device.

FIGS. 10 and 11 are two views of the locking device, similar to FIGS. 10 and 11, during unlocking and at the end of unlocking, respectively.

DESCRIPTION OF THE PREFERRED EMBODIMENT

Figure 2:
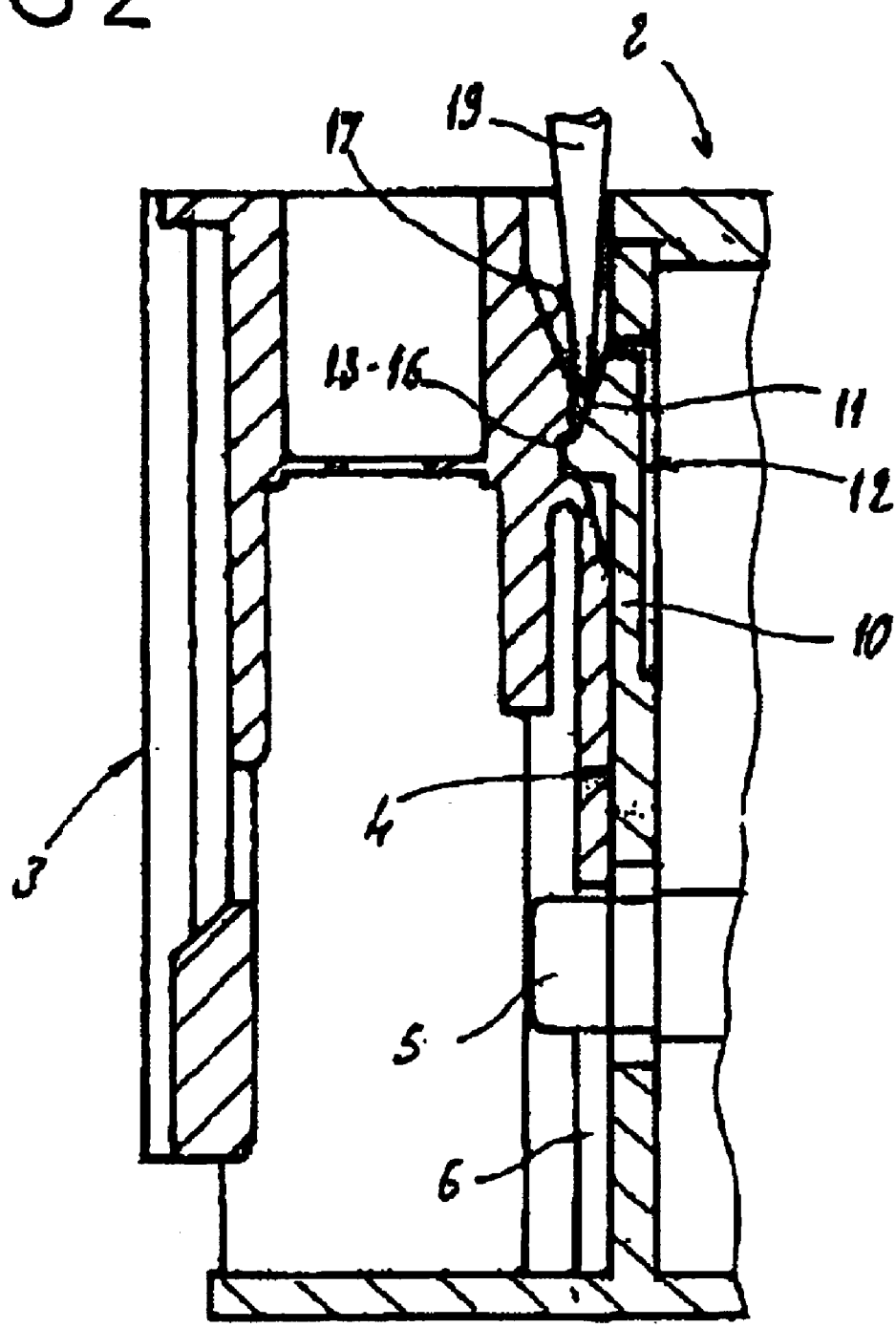
FIG. 2 is a longitudinal sectional view on an enlarged scale of a module mated with a box.
Figure 8:
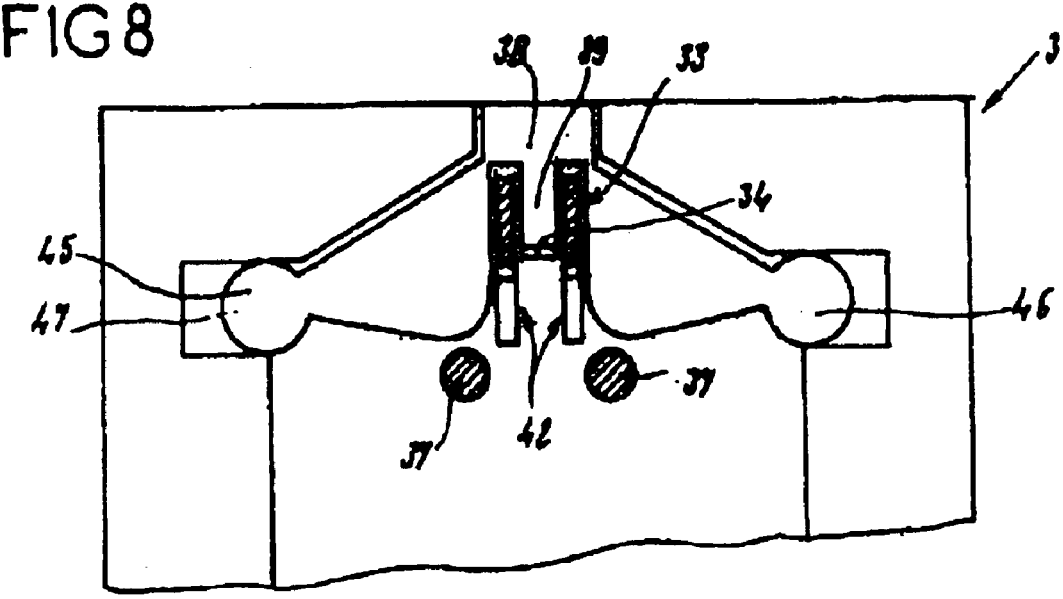
FIG. 8 is a sectional view passing through the mating plane of the box and of the module of the locking device.
Figure 9:
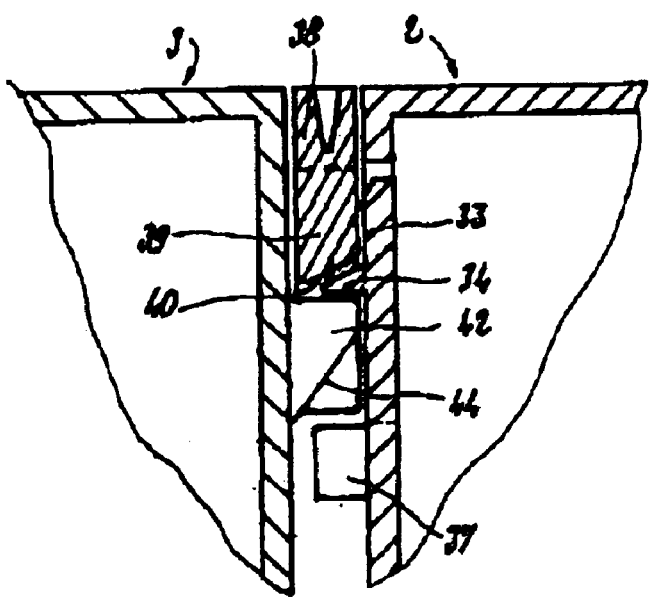
FIG. 9 is a sectional view on an enlarged scale of the locking device on the line IX—IX in FIG. 8.

FIG. 1 shows an electronic box 2 and a connecting module 3 that are intended to be coupled with the longitudinal mating face 4 of the box, pins 5 project from said face, which pins 5 are intended to be engaged in slots 6 that the connection module 3 has. This connection module includes means for connection to electrical cables, these means not being shown.

The module 3 and the box 2 are mated by means of a discontinuous slide system 7, 8. This slide system makes it possible, after making the module bear against the box with a certain longitudinal shift, to mate them by longitudinal sliding.

In the first embodiment shown in FIGS. 1 and 2, the box has, on its mating face and near its upper face 9, a resilient tab 10 having a hook 12 formed by a horizontal rib 13. Between the upper face of the box and the rib 13, the hook 12 has an inclined surface 14 angled downward and outward.

It should be noted that the notions of upper face of the box and of the module are relative positions used conventionally in the present description. It goes without saying that it will be possible for the face 9 of the box not to be the upper face if the box were to occupy another position in space.

The connection module 3 has, in its mating face, a recess 14 opening into its upper face 15. Provided in this recess is a transverse groove 16 intended to accommodate the rib 13 of the hook 12. Provided above the groove 16 is a surface 17 inclined downward and outward.

FIG. 2 shows a sectional view of the box and the module in the mated position. It is apparent from this figure that, in the mating position, the rib 13 is engaged in the groove 16. It is also apparent from this figure that the surfaces 11 and 17 inclined in opposite directions allow the introduction of a tool 19, such as a screwdriver, which will cause, by a single axial movement, owing to the wedge effect that it exerts, the hook 12 to tilt toward its open position, so as to allow the module 3 to be released.

FIGS. 3 to 6 show a second embodiment of this device, in which the same elements are denoted by the same reference numbers as previously.

In this device, the module 3 has, in its mating face, a recess 22 in which an unlocking piece, comprising a stud 23, is mounted so as to slide. Articulated to the stud 23 at 24 is a rigid arm 25, the free end 26 of which is engaged between a bottom stop 27 and a top stop 28. When the module is in the locking position on the box, the bottom stop 27 serves to catch an elastically deformable hook 29 mounted on the box. When the module is mounted on the box, as is the case in the embodiment shown in FIG. 4, a stop 30 protruding from the mating face of the box is located slightly below the bottom stop 27 of the module. FIG. 4 shows the module in the mated position on the box. In this position, the hook 29 is engaged behind the bottom stop 27. When the operator exerts vertical pressure on the sliding stud 23, the latter is pushed into the recess 22 and the arm 25 pivots at the articulation 24 with respect to the studs. Owing to the length of the arm 25, the latter pushes the hook outward, ensuring that the module is released from the box. This position is shown in FIG. 5. When the operator continues to exert pressure on the stud 23, the arm 25 bears against the top stop 28 and ensures lifting of the module because of the pivoting of the arm relative to the fixed stop 30. This position is shown in FIG. 6.

FIGS. 7 to 11 show a third embodiment of this device, in which the same elements are denoted by the same reference numbers as previously.

In this case, the box 2 has, in its mating face, an elastically deformable tab 32 located approximately at mid-width of this face and comprising two locking hooks 33 situated on either side of a central unlocking rib 34. The central unlocking rib extends beyond the two hooks 33. Each hook 33 has from the top down an engagement surface 35 inclined downward and outward and an engagement surface 36 for the purpose of locking, perpendicular to the mating plane of the box and of the module. The mating face of the box 2 has, below the tab 32, two symmetrical fixed stops 37.

The connection module 3 includes, in its mating face, an unlocking piece 38 mounted so as to slide parallel to the mating plane and accessible from the upper face of the module. This unlocking piece has a central drive rib 39 having a surface 40 inclined downward and inward, intended to bear, during unlocking, on the central rib 34 of the tab 32 on the box 2. Projecting from the mating face of the connection module 3 are two stops 42 with the same spacing as the hooks 33 on the box 2 and themselves having a catching surface 43 perpendicular to the mating plane and a surface 44 inclined downward and inward, that is to say with the opposite inclination to that of the surfaces 35 of the hooks 33.

The unlocking piece 38 is extended by two branches 45 symmetrical with respect to the piece 38 and each articulated on this piece about an axis perpendicular to the mating plane of the box and of the module. The free ends 46 of the arms 45 are each engaged in a cavity 47 made in the module, this cavity being horizontal.

During mating of the module with the box, the inclined surfaces 44 of the stops 42 bear against the inclined surfaces 35 of the hooks 33, causing the tab 32 to retract. When the inclined surfaces escape from each other, the catching surfaces 36 and 43 of the hooks and of the stops respectively come into engagement, ensuring that the module is locked onto the box. The device is in the position shown in FIGS. 8 and 9 in the drawing. To unlock them, the operator presses on the piece 38 using a tool such as a screwdriver. During this movement, the central drive rib 39 on the module bears against the central unlocking rib 34 on the box, causing the tab to tilt and the hooks 33 to move away, releasing the latter from the stops 42. When the displacement movement of the piece 38 continues, as shown in FIG. 10, the arms 45 bear against the stops 37 on the box. When the movement continues further, the stops 37 cause the arms to tilt upward, making the module undergo a sliding movement relative to the box, in the direction for disconnecting these two elements.

As is apparent from the foregoing, the invention provides a great improvement over the existing technique, by providing a device of simple structure, allowing a connection module to be reliably and rapidly uncoupled from an electronic connection box.

As goes without saying, the invention is not limited to just the embodiments of this device that have been described above by way of example. On the contrary, it encompasses all variants thereof. Thus, in particular, various features presented above may be combined in a different manner without thereby departing from the scope of the invention.

What is claimed is:

1. A connection device for an electronic box, comprising a connection module (3) intended to be coupled with the longitudinal mating face of a box (2) and making an electrical connection with, on the one hand, pins projecting from this longitudinal mating face and, on the other hand, with conducting cables, the module (3) and the box (2) being mated by a system of slides (7, 8) allowing them to be fastened by longitudinal sliding, with locking by a resilient tab (10, 29, 32), the resilient tab (10, 29, 32) is associated with the box (2) and is intended to cooperate with a locking member (16, 27, 42) associated with the connection module (3), the resilient locking tab (10) is in the form of an elastically deformable hook (12) provided with a catching rib (13), while the locking member associated with the connection module has a groove (16) with which the rib (13) of the hook is intended to be engaged, in the locking position, wherein the connection module (3) includes, in its mating face for mating with the box, a recess (14) which, intended for housing the locking hook (12) on the box (2), is bounded on the inside of the module by a surface (17) which is inclined from the upper face of the module toward its lower face, and from the inside outward, the groove (16) for accommodating the rib of the hook being situated below this inclined surface (17) and wherein the hook (12) has, above its catching rib (13), a surface (11) that is inclined from the upper face of the box (2) toward its lower face, and from the inside outward.

2. A connection device for an electronic box, comprising a connection module (3) intended to be coupled with a longitudinal mating face of a box (2) and making an electrical connection with, on the one hand, pins projecting from this longitudinal mating face and, on the other hand, with conducting cables, the module (3) and the box (2) being mated by a system of slides (7, 8) allowing them to be fastened by longitudinal sliding, with locking by a resilient tab (10, 29, 32), the resilient tab (10, 29, 32) is associated with the box (2) and is intended to cooperate with a locking member (16, 27, 42) associated with the connection module (3), wherein the box (2) includes an elastically deformable hook (29) intended, in the locking position, to engage behind a stop (27) integral with the connection module (3), the letter being equipped with an unlocking piece having a drive part (23) which, accessible from its upper face, is able to be moved in translation, perpendicular to the latter, a part (26) for actuating the hook (29) toward its unlocking position, when the drive part (23) has undergone a first travel, a part (25) for bearing on a fixed stop (30) on the box when the drive part (23) has undergone a second travel and a part (26) for bearing on a fixed stop (28) of the module, for the purpose of making the module (3) slide relative to the box (2), when the drive part is actuated beyond this second travel.

3. The device as claimed in claim 2, wherein the piece for unlocking the connection module comprises a drive part formed by a stud (23) to which one end of a rigid arm is articulated, about an axis (24) perpendicular to the axis of translation of the stud, the other end (26) of which rigid arm (25) is engaged between two vertically offset stops (27, 28), the lower one (27) of which serves for catching the hook (29) on the box, the length of the arm (25) being such that, when the drive stud (23) is opposite the stops (27, 28), the free end (26) of the arm (25) disengages the hook (29) with respect to the bottom stop (27) for catching the latter, a fixed stop (30) being provided on the box, beneath the stops (27, 28) on the module and approximately halfway along the arm, against which stop the arm (25) bears when the stud (23) is actuated in translation beyond the position of disengagement of the hook, the free end (26) of the arm then bearing against the high stop (28) on the module and ensuring that the latter moves in translation with respect to the box (2).

4. A connection device for an electronic box, comprising a connection module (3) intended to be coupled with a longitudinal mating face of a box (2) and making an electrical connection with, on the one hand, pins projecting from this longitudinal mating face and, on the other hand, with conducting cables, the module (3) and the box (2) being mated by a system of slides (7, 8) allowing them to be fastened by longitudinal sliding, with locking by a resilient tab (10, 29, 32), the resilient tab (10, 29, 32) is associated with the box (2) and is intended to cooperate with a locking member (16, 27, 42) associated with the connection module (3), wherein the box (2) includes, in its mating face, an elastically deformable tab (32) located approximately at mid-width of this face and having two locking hooks (33) located on either side of a central unlocking rib (34), while the connection module (3) includes two fixed stops (42) intended to cooperate with the two hooks (33) on the box and is equipped with an unlocking piece (38) mounted so as to slide perpendicular to the upper face of the module and having a rib (39) intended, when the piece (38) is pushed into the module (3), to bear against the central rib (34) of the tab (32) on the box in order to make said tab tilt toward the position for unlocking the hooks.

5. The device as claimed in claim 4, wherein the hooks (33) on the box (2) and the catching stops (42) on the module (3) have catching surfaces (36, 43) perpendicular to the mating plane of the box (2) and of the module (3) and engagement surfaces (35, 44) of reverse inclination in the case of the box (2) and the module (3).

6. The device as claimed in claim 4, wherein the central unlocking rib (34) goes beyond the tab locking hooks (33) on the box (2).

7. The device as claimed in claim 4, wherein the piece (38) for unlocking the connection module (3) is extended by two symmetrical branches (45) that are articulated to the piece about axes perpendicular to the mating plane of the box and of the module, the free ends (46) of the branches being engaged in two horizontal cavities (47) provided in the module (3), and the branches (45) being each intended to bear, when the unlocking piece (38) is actuated beyond the position for releasing the hooks, against a fixed stop (37) integral with the box (2), so as to cause the ends of the branches (45) to tilt upward and the module (3) to move relative to the box (2).

8. The device as claimed in claim 5, wherein the central unlocking rib (34) goes beyond the tab locking hooks (33) on the box (2).

9. The device as claimed in claim 5, wherein the piece (38) for unlocking the connection module (3) is extended by two symmetrical branches (45) that are articulated to the piece about axes perpendicular to the mating plane of the box and of the module, the free ends (46) of the branches being engaged in two horizontal cavities (47) provided in the module (3), and the branches (45) being each intended to bear, when the unlocking piece (38) is actuated beyond the position for releasing the hooks, against a fixed stop (37) integral with the box (2), so as to cause the ends of the branches (45) to tilt upward and the module (3) to move relative to the box (2).

10. The device as claimed in claim 6, wherein the piece (38) for unlocking the connection module (3) is extended by two symmetrical branches (45) that are articulated to the piece about axes perpendicular to the mating plane of the box and of the module, the free ends (46) of the branches being engaged in two horizontal cavities (47) provided in the module (3), and the branches (45) being each intended to bear, when the unlocking piece (38) is actuated beyond the position for releasing the hooks, against a fixed stop (37) integral with the box (2), so as to cause the ends of the branches (45) to tilt upward and the module (3) to move relative to the box (2).

* * * * *